United States Patent Office 2,834,791
Patented May 13, 1958

2,834,791
PROCESS FOR PREPARING ISOVIOLANTHRONE

Maurice H. Fleysher, Buffalo, N. Y., assignor to Allied Chemical & Dye Corporation, New York, N. Y., a corporation of New York No Drawing. Application December 8, 1954
Serial No. 474,018

6 Claims. (Cl. 260—358)

This invention relates to a process for preparing isoviolanthrone.

Isoviolanthrone is the violet dyestuff identified in the Colour Index as No. 1103, and is also an intermediate in the preparation, by chlorination, of the related reddish violet dyestuff identified in the Colour Index as No. 1104.

Isoviolanthrone has been prepared in the past by fusion of Bz-1, Bz-1'-dibenzanthronyl sulfide or selenide with alcoholic potassium hydroxide, for example, as disclosed in U. S. Patent 1,821,023, in which condensation takes place according to the following scheme:

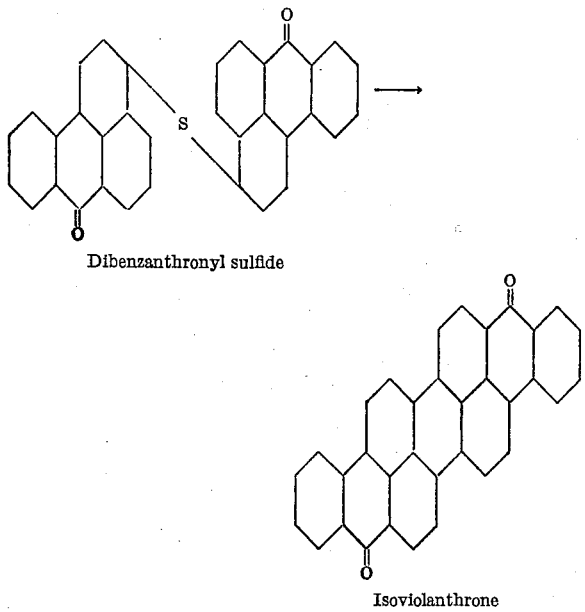

Dibenzanthronyl sulfide

Isoviolanthrone

It is well known, that, in the preparation of isoviolanthrone by caustic fusion, the use of potassium hydroxide has been unique, and could not be replaced by sodium hydroxide. Thus, when an attempt is made to replace potassium hydroxide in prior art processes by admixing ethyl alcohol, sodium hydroxide and Bz-1, Bz-1'-dibenzanthronyl sulfide in the customary ratios of 5 parts caustic soda and 4–5 parts ethyl alcohol to 1 part of Bz-1, Bz-1'-dibenzanthronyl sulfide, the mixture sets up to a solid mass which, as a mixture, cannot be liquefied at the usual reaction temperatures, even by the application of pressure, and in which the desired reaction fails to take place.

As far as I am aware, all efforts heretofore made, to use the cheaper and more readily available sodium hydroxide as the sole caustic alkali material in place of potassium hydroxide, in the preparation of isoviolanthrone by alcoholic caustic fusion, have been unsuccessful.

An object of the present invention is to provide a process for condensing Bz-1, Bz-1'-dibenzanthronyl sulfide and selenide to isoviolanthrone in an alcoholic caustic fusion process in which sodium hydroxide is the sole caustic alkali employed.

Another object of the invention is to provide a process for the production of isoviolanthrone in higher yields than have heretofore been obtained.

A still further object of the invention is to provide an isoviolanthrone product which can be readily chlorinated to an extremely brilliant and desirably redder shade of dichlorinated isoviolanthrone, superior to the standard commercial product identified as Colour Index 1104.

A still further object of the invention is to provide a process for producing isoviolanthrone by caustic fusion which employs less caustic than has heretofore been required.

These and other objects are accomplished according to my invention in which sodium hydroxide, a saturated, lower aliphatic monohydric alcohol and the Bz-1, Bz-1'-dibenzanthronyl sulfide or selenide intermediate are mixed in weight ratios of at least about 1 part of sodium hydroxide, to 1 part of intermediate, and the mixture is heated to reaction temperature under such conditions and in the presence of an amount of alcohol sufficient to maintain the mixture as a homogeneous, fluid mass during the course of the reaction.

The ratios in which the three components of the fusion mixture are used, is critical, a ratio of at least 1 part by weight of sodium hydroxide per part of intermediate being necessary to bring about the desired condensation. To maintain the reaction medium as a homogeneous fluid mixture which can be agitated at the reaction temperature, at least about 2 parts of alcohol per part of sodium hydroxide are required in the case of the alcohols having from 1–3 carbon atoms, and at least about 1.25 parts in the case of the 4–8 carbon atom alcohols.

In addition to maintaining the ratios specified, it is necessary, when using an alcohol having less than 4 carbon atoms, to carry out the reaction in a confined space under at least autogenously developed superatmospheric pressure in order to maintain a fluid reaction medium whch can be brought to the reaction temperature necessary for condensation. On the other hand, when using lower alcohols having four or more carbon atoms, i. e. 4 to 8 carbon atoms inclusive, fluidity at the reaction temperature may be maintained at atmospheric pressures, with the use of reflux. Use of $C_1$ to $C_3$ carbon atom alcohols is the preferred modification of the process under present conditions, because of the relative cheapness and availability of these alcohols, especially ethyl alcohol, which offset the expense attending the use of pressure equipment. On the other hand, under conditions in which the use of pressure would be inconvenient or undesirable, use of the higher alcohols, particularly isobutyl alcohol, would be preferred.

In carrying out the process according to the embodiment of my invention in which the $C_1$ to $C_3$ alcohols are used, I charge a suitable pressure vessel or autoclave with a mixture of alcohol, sodium hydroxide and Bz-1, Bz-1'-dibenzanthronyl sulfide or selenide in the proportions indicated. The vessel is closed, and the charge is heated with agitation to the reaction temperature of between about 115° C. and about 140° C. during which time an autogenous pressure of between about 60 p. s. i. (gauge) and about 100 p. s. i. (gauge) develops. The fusion mass is held at the reaction temperature and pressure until condensation is substantially complete, usually between about 10 hours and about 18 hours. The charge is then cooled while continuing agitation; the pressure is released and the charge is diluted with water and removed from the pressure vessel. The isoviolanthrone product is worked up and recovered in conventional manner, as by aerating the diluted mass to oxidize the leuco product to the quinoid form. The batch, after oxidation, is filtered, washed, resuspended and reaerated if desired, then again washed, filtered and finally dried.

Using $C_4$ to $C_8$ alcohols, the procedure employed may be essentially the same as described above except that the reaction vessel used need not be a pressure vessel or autoclave, and instead, the reaction may be carried out under reflux at similar reaction temperatures.

The reaction time in either case may vary somewhat, but will usually be between about 10 hours and about 18 hours, the time of reaction usually being slightly longer without the use of pressure. Completion of the reaction is readily established by the following test:

A 5 gram sample of the fusion mass is mixed with 250 ml. of warm (65° C.) water, 2 ml. of 50% aqueous caustic soda, and 4 grams of sodium hydrosulfite ($Na_2S_2O_4$). The agitated, resulting aqueous mixture, at a temperature between 60° and 70° C., is filtered.

The fusion is incomplete if the filtrate, spotted on white paper, forms a yellow run-out, and the residue on the filter is yellowish and dissolves in concentrated sulfuric acid to form a blue solution. The fusion is complete if the spotted filtrate is violet, and the residue after oxidation (by aeration or perborate treatment) dissolves in concentrated sulfuric acid to a green solution.

As pointed out above, the quantity of sodium hydroxide used should be at least about equal in weight to the weight of dibenzanthronyl sulfide or selenide used, preferably between about 1 part and about 3 parts of NaOH per part of intermediate. Greater quantities do no harm but are not necessary and their use would be wasteful.

The quantity of alcohol used is a function of the sodium hydroxide, larger proportions of sodium hydroxide requiring larger proportions of alcohol to maintain the required fluidity of the mixture at reaction temperature. Somewhat lesser quantities of the higher boiling $C_4$–$C_8$ alcohols may be used than are necessary for the lower boiling $C_1$–$C_3$ alcohols.

The required fluidity is that customarily present in fusion masses of comparable types of reactions in which potassium hydroxide is used, that is, a fluidity which permits ready agitation with conventional agitating mechanisms used in such fusions, for example, a viscosity ranging roughly between that of water and that of lubricating oil, preferably a fluidity corresponding to a viscosity of the order of magnitude of that of water or glycerin. Quantities of alcohol in any case will be substantially in excess of the quantity of sodium hydroxide by weight, and quantities in the ratio of at least about 2 parts of a $C_1$–$C_3$ alcohol per part of sodium hydroxide by weight should be used, preferably between about 2 parts and about 6 parts per part of sodium hydroxide. Using the $C_4$–$C_8$ alcohols, at least about 1.25 parts of alcohol per part of sodium hydroxide are required, preferably between about 1.5 parts and about 3 parts.

The following specific examples will further illustrate the invention. Parts are by weight except as otherwise noted.

*Example 1*

A steel autoclave, fitted with the necessary accessories, was charged with a mixture of 305 parts denatured ethyl alcohol 2B, 150 parts caustic soda in flake form, and 100 parts Bz–1, Bz–1'-dibenzanthronyl sulfide. The autoclave was closed and the agitated charge was held for about ½ to 1 hour before it was heated to about 125° C. (±10° C.). At that temperature the pressure in the autoclave was between 60 and 100 p. s. i. (gauge). The fusion was held at about 125° C. for about 15 hours, then agitated till cool and pressure was low enough to permit dilution with water and removal of the fusion mass from the autoclave. The charge was adjusted to about 7000 parts water volume and then aerated for about 15 hours to oxidize the leuco form of the formed isodibenzanthrone to the quinoid form. The batch after aeration was filtered; the filter cake was washed to weak alkalinity with water, and then suspended in 4000 parts water at 90° to 95° C. The slurry was aerated for about 4 hours and filtered. The filter cake was washed free of alkali and dried.

The dry cake, comprising for the most part isoviolanthrone, amounted to 86 parts, and in terms of pure isoviolanthrone was equivalent to a yield of 107.5% as compared wtih yields obtained by prior art process using potassium hydroxide and ethyl alcohol. The dry product thus obtained was chlorinated until it contained an amount of organically combined chlorine substantially equal to that in dichloroisoviolanthrone. The chorinated dyestuff was conditioned to a vat-dye paste at a color value corresponding to the commercial standard vat-dye paste, of the dyestuff identified as C. I. 1104. The yield of standardized paste so obtained by means of the invention from 100 parts of Bz–1, Bz–1'-dibenzanthronyl sulfide was about 107% of the best obtainable by any of the prior art methods. It imparted a considerably redder and brighter shade of violet than that imparted by the established commercial type which was made by a fusion as described in the prior art of Bz–1, Bz–1'-dibenzanthronyl sulfide with ethyl alcohol and potassium hydroxide. The redness and brightness of shade imparted by the prepared violet dyestuff paste are desirable and noteworthy. They indicate that the isoviolanthrone of the example is purer than that made by prior art processes. The purer product, when dichlorinated and converted to aqueous vat dyestuff paste, with a color value equal to that of the commercial standard of the same dyestuff but made by a prior art method, yields the violet which is superior to that of the standard in shade and brightness even though the dye solids in both pastes have the same percent content of organically combined chlorine.

The novel process of the invention is commercially advantageous not only because of the higher yields and more desirable product produced but also because it contributes to desirable economies in manufacture by using sodium hydroxide, which is much less costly than potassium hydroxide.

Either methyl alcohol or propyl or isopropyl alcohol may be substituted for ethyl in the above example with like results. Similarly, Bz–1, Bz–1'-dibenzanthronyl selenide may be substituted for the sulfide.

*Example 2*

A steel fusion kettle fitted with an agitator and reflux condenser open to the atmosphere was charged with a mixture of 280 parts isobutyl alcohol and 180 parts caustic soda. The agitated mass was heated to 110° C. and 60 parts Bz–1, Bz–1'-dibenzanthronyl sulfide were added. The mixture was heated to its initial refluxing temperature (about 116° C.) and refluxed for about 18 hours. The fusion mass was then diluted with water to about 5000 parts water volume, and aerated for about 16 hours. Thereafter, the aqueous alkaline mass was filtered; the filter cake was washed with water until nearly alkali-free, and then suspended in water at 90°–95° C., the product was aerated for 4 hours, and again separated as a cake by filtration. The cake was washed alkali-free and dried. The dry product, containing chiefly isoviolanthrone, amounted to 60.1 parts.

The dry product was dichlorinated and treated physically to yield a vat-dye paste which had a color value per unit weight of paste equal to that of the commercial standard dyestuff identified as C. I. 1104. In the comparison with the latter, the paste of the invention so made, imparted desirably, much redder and much brighter shades than the commercial type, and the yield of the new paste so made, based on the Bz–1, Bz–1'-dibenzanthronyl sulfide from which it was derived, was better than that obtained by the alcohol-potassium hydroxide method of the prior art. As in the case of the product of Example 1, this superiority of final dyestuff is attributed to the superior quality of the isoviolanthrone obtainable by the foregoing process.

While the above describes the preferred embodiments of the invention, it will be understood that departures may be made therefrom within the scope of the specification and claims.

I claim:

1. A process for preparing isoviolanthrone which comprises heating to a temperature between about 115° C. and about 140° C., a homogeneous, fluid mixture of sodium hydroxide, a saturated lower aliphatic monohydric alcohol having from 1 to 8 carbon atoms inclusive, and a compound selected from the group consisting of Bz-1,Bz-1'-dibenzanthronyl sulfide and Bz-1, Bz-1'-dibenzanthronyl selenide, in the proportions of between about 1 part and about 3 parts of sodium hydroxide to 1 part of dibenzanthronyl compound, a ratio of alcohol to sodium hydroxide substantially in excess of 1 and at least sufficient to maintain the mixture in fluid condition at temperatures between about 115° C. and about 140° C., and continuing said heating until condensation to isoviolanthrone is substantially complete.

2. A process for preparing isoviolanthrone which comprises heating in a confined space under autogenous pressure to a temperature between about 115° C. and about 140° C. a mixture of sodium hydroxide, saturated aliphatic, monohydric alcohol having from 1 to 3 carbon atoms inclusive, and a compound selected from the group consisting of Bz-1, Bz-1'-dibenzanthronyl sulfide and Bz-1, Bz-1'-dibenzanthronyl selenide in the proportions of between about 1 part and about 3 parts of sodium hydroxide and between about 2 parts and about 6 parts of alcohol to 1 part of dibenzanthronyl compound, the ratio of alcohol to sodium hydroxide being at least about 2:1, until condensation to isoviolanthrone is substantially complete.

3. The process according to claim 2 wherein the dibenzanthronyl compound is Bz-1, Bz-1'-dibenzanthronyl sulfide.

4. The process according to claim 2 wherein the dibenzanthronyl compound is Bz-1, Bz-1'- dibenzanthronyl sulfide and the alcohol is ethyl alcohol.

5. A process for preparing isoviolanthrone which comprises heating at atmospheric presure under reflux to a temperature between about 116° C. and about 140° C. a homogeneous fluid mixture of sodium hydroxide, a saturated lower aliphatic monohydric alcohol having from 4 to 8 carbon atoms inclusive, and a compound selected from the group consisting of Bz-1, Bz-1'-dibenzanthronyl sulfide and Bz-1, Bz-1'-dibenzanthronyl selenide, in the proportions of between about 1 part and about 3 parts of sodium hydroxide and at least about 1.25 parts of alcohol, to one part of dibenzanthronyl compound, the ratio of alcohol to sodium hydroxide being between about 1.25:1 and about 3.75:1, until condensation to isoviolanthrone is substantially complete.

6. The process according to claim 5 wherein the dibenzanthronyl compound is Bz-1, Bz-1'-dibenzanthronyl sulfide and the alcohol is isobutyl alcohol.

References Cited in the file of this patent

UNITED STATES PATENTS

| | | |
|---|---|---|
| 1,821,023 | Nawiasky et al. | Sept. 1, 1931 |
| 1,954,482 | Knowles | Apr. 10, 1934 |
| 2,468,606 | Scalera et al. | Apr. 26, 1949 |